US011131809B2

(12) United States Patent
Villafranca Velasco et al.

(10) Patent No.: US 11,131,809 B2
(45) Date of Patent: Sep. 28, 2021

(54) INTEGRATED POLARIZATION SPLITTER

(71) Applicants: CONSEJO SUPERIOR DE INVESTIGACIONES CIENTÍFICAS (CSIC), Madrid (ES); UNIVERSIDAD DE MÁLAGA, Malaga (ES)

(72) Inventors: Aitor Villafranca Velasco, Madrid (ES); Alaine Herrero Bermello, Madrid (ES); Pedro Corredera, Madrid (ES); Robert Halir, Malaga (ES); Alejandro Ortega Moñux, Malaga (ES); J. Gonzalo Wangüemert Pérez, Malaga (ES); Inigo Molina Fernández, Malaga (ES)

(73) Assignees: CONSEJO SUPERIOR DE INVESTIGACIONES CIENTÍFICAS (CSIC), Madrid (ES); UNIVERSIDAD DE MÁLAGA, Malaga (ES)

( * ) Notice: Subject to any disclaimer, the term of this patent is extended or adjusted under 35 U.S.C. 154(b) by 0 days.

(21) Appl. No.: 16/966,678

(22) PCT Filed: Jan. 24, 2019

(86) PCT No.: PCT/ES2019/070031
§ 371 (c)(1),
(2) Date: Jul. 31, 2020

(87) PCT Pub. No.: WO2019/158790
PCT Pub. Date: Aug. 22, 2019

(65) Prior Publication Data
US 2021/0033789 A1 Feb. 4, 2021

(30) Foreign Application Priority Data

Feb. 13, 2018 (ES) ............................... ES201830129

(51) Int. Cl.
*G02B 6/126* (2006.01)
*G02B 5/18* (2006.01)
(Continued)

(52) U.S. Cl.
CPC ........... *G02B 6/126* (2013.01); *G02B 5/1809* (2013.01); *G02B 6/0288* (2013.01); *G02B 6/2813* (2013.01); *G02B 2006/1209* (2013.01)

(58) Field of Classification Search
None
See application file for complete search history.

(56) References Cited

U.S. PATENT DOCUMENTS

| 5,838,842 A | 11/1998 | Mackie |
| 6,445,849 B2 | 9/2002 | Kinoshita |

(Continued)

FOREIGN PATENT DOCUMENTS

| ES | 2379058 A1 | 4/2012 |
| WO | 2016123719 A1 | 8/2016 |

OTHER PUBLICATIONS

Erez Hasman, "Polarization Beam-Splitters and Optical Switches Based on Space-Variant Computer-Generated Subwavelength Quasi-Periodic Structures", Journal, 2002, 45-54, vol. 209, Optics Communications.

(Continued)

*Primary Examiner* — Jerry Rahll
(74) *Attorney, Agent, or Firm* — Hayes Soloway PC

(57) ABSTRACT

The invention relates to an integrated polarisation splitter based on a sub-wavelength multimode interference coupler (110), in other words, a multimode interference coupler (110) with an anisotropic multimode waveguide region formed by a plurality of sections of core material (210) and a plurality of sections of a cladding material (230) alternately arranged in a periodic way, with a period (Λ) smaller (Continued)

than the wavelength of a light propagated through said anisotropic region. The core material sections (210) are rotated an angle ($\alpha$) greater than zero with respect to a perpendicular with an input waveguide (120) to increase the anisotropic character of the multimode waveguide region.

10 Claims, 4 Drawing Sheets

(51) Int. Cl.
    *G02B 6/028*     (2006.01)
    *G02B 6/12*     (2006.01)
    *G02B 6/28*     (2006.01)

(56) References Cited

U.S. PATENT DOCUMENTS

| | | |
|---|---|---|
| 7,035,494 B1 | 4/2006 | Mackie |
| 2013/0136389 A1 | 5/2013 | Luo et al. |
| 2016/0282555 A1 | 9/2016 | Kojima et al. |
| 2017/0248760 A1 | 8/2017 | Hu et al. |

OTHER PUBLICATIONS

Dirk Taillaert, "A Compact Two-Dimensional Grating Coupler Used as a Polarization Splitter", Journal, 2003, 1249-1251, vol. 15, No. 9, IEEE Photonics Technology Letters.
A. Maese-Novo, "Wavelength Independent Multimode Interference Coupler", Journal, 2013, 7033-7040, vol. 21, No. 3, Optics Express.

INTEGRATED POLARIZATION SPLITTER

OBJECT OF THE INVENTION

The present invention relates to the field of integrated optics and, more specifically, to a polarisation splitter.

BACKGROUND OF THE INVENTION

One of the main problems in the world of integrated optics is the dependence of photonic devices on polarisation. Thus, the majority of devices currently designed are exclusive for transverse electric (TE) polarisation or for transverse magnetic (TM) polarisation. The integration of polarisation splitters, so frequently used in free-space optics, is therefore of significant interest, given that the optical power transported by orthogonal polarisation to that of design will become a source of interference if not removed from the circuit. Different optical phenomena, materials and structures have been proposed with the aim of implementing said polarisation splitters. Noteworthy among the alternatives proposed are sub-wavelength diffraction gratings, photonic crystals, the negative refraction present in said crystals or form birefringence (intrinsic in the materials). However, all of these configurations have serious problems in the manufacturing thereof, either due to a heightened sensitivity to deviations with respect to nominal designs, which are inevitable during the manufacturing process, or due to the fact that they require geometries or auxiliary elements that cannot be implemented by the standard manufacturing procedures of commercial photonic chips.

One possible solution to the aforementioned manufacturing limitations is the use of multimode interference (MMI) couplers. For example, U.S. Pat. No. 5,838,842 discloses an MMI for polarisation splitting in integrated devices. The MMI has a multimode waveguide region (also known as a "slab") in which self-imaging of the transverse electric (TE) and transverse magnetic (TM) modes is generated at different lengths. Said lengths are determined by the differences in the propagation constants of both modes in the multimode waveguide region. However, given that the multimode waveguide region is a continuous waveguide, the differences between the propagation constants are small and hard to control, resulting in devices with low efficiency and which require large propagation distances in the multimode waveguide region, thereby leading to an increased total size of the device.

It must be noted that multimode interference (MMI) couplers have also been used conventionally for power splitting, in other words, instead of separating two polarisations into two output waveguides, part of the power of a single polarisation is separated into two or more output waveguides. The features of MMI as power splitters, and particularly the losses and the bandwidth thereof, have been improved by means of the use of sub-wavelength grating (SWG) structures, as shown in patent ES2379058. It must be noted that the SWG structures of said power splitter, in addition to being perpendicular to the input and output waveguides, are designed to operate in a wide bandwidth at one polarisation. In other words, the geometric parameters of said SWG structure are selected so that the bandwidth of the device is optimised for one polarisation, the device being inoperative at the orthogonal polarisation. Specifically, the birefringence of the multimode waveguide region implies different beat lengths for the TE and TM polarisations, and thus the positions of the MMI in which power splitting is verified are different for each polarisation, preventing the joint removal thereof. In other words, in these types of devices, the birefringence and the anisotropy of the SWG structure are not controllable during design, but rather are a consequence of the geometric parameters thereof.

Multimode interference (MMI) couplers have also been used as wavelength multiplexers by means of the incorporation of an anisotropic optical filter in the centre of said MMI, as shown in U.S. Pat. No. 6,445,849. It must be noted that in this case, in addition to the fact that the device operates at a single polarisation, the other polarisation being unusable, the anisotropic structure of the MMI is an external element implemented with another material that is different from that of the core and that of the cladding, and with a geometry that impedes the arrangement thereof according to the usual methods for manufacturing said core and cladding, which hampers the manufacturing and integration of the device.

Another relevant document is US2016282555A1, which introduces an optical manipulator which includes a first section for propagating an optical signal with multiple polarization modes including a transverse electric mode and a transverse magnetic mode, and a second section for propagating separately the transverse electric mode and the transverse magnetic mode of the optical signal. The optical manipulator also includes a multi-mode interference (MMI) section having a groove with a first refractive index less than a second refractive index of the MMI section. The groove extends along an entire length of the MMI section to partition the MMI section into two connected channels including a first channel and a second channel. The first section is connected to the first channel and the second section is connected to both the first and the second channels.

In document WO2016123719A1 a method of modifying an optical waveguide is described, wherein a pre-existing core waveguide and/or the surrounding (evanescent) volume is irradiated with external radiation in a preferentially shaped beam with sufficient intensity to create permanent refractive index changes of a controlled cross-sectional shape and pattern along the axial length of the pre-existing core waveguide. This reshaping of the waveguide serves in several ways, for example, to modify the mode profile, the propagation constant of each permitted mode, the birefringence, and the radiation mode losses of the pre-existing guided modes. Further, the reshaping can enable a change in the number of modes permitted to propagate in selected portions of an optical waveguide. In this way, a Multimode Interference (MMI) waveguide section can be introduced selectively into the pre-existing waveguide.

Also in document US2017248760A1 it is described an optical demultiplexer/multiplexer, comprising: a multimode interference waveguide; at least one first coupling waveguide which meets the multimode interference waveguide at at least one first location and a plurality of second coupling waveguides which meet the multimode interference waveguide at a plurality of second locations which are spaced in a direction of transmission in relation to the at least one first location, with the at least one first coupling waveguide and the second coupling waveguides together with the multimode interference waveguide providing a first angled multimode interferometer which operates to demultiplex a first optical signal having optical channels of a plurality of wavelengths or multiplex optical signals of a plurality of wavelengths into a first optical signal having optical channels of the plurality of wavelengths.

Relating to the same technical field, document U.S. Pat. No. 7,035,494B1 describes a multimode interference device and method of making the same, and which comprises at least one input port, at least one output port, a multimode interference region separating the input port from the output port, and at least one subregion in the multimode interference region, wherein a self-image length within the multimode interference regions is reduced by a factor that is approximately equal to one plus a number of subregions configured in the multimode interference region, wherein the at least one subregion is configured to have an effective width and effective refractive index running longitudinally through the multimode interference region.

Lastly, document US2013136389A1 introduces an optical de-MUX which includes a sub-wavelength grating that magnifies an input optical signal. In particular, along a direction perpendicular to a propagation direction of the optical signal, the sub-wavelength grating has a spatially varying effective index of refraction that is larger at a centre of the sub-wavelength grating than at an edge of the sub-wavelength grating. Moreover, the optical de-MUX includes an optical device that images and diffracts the optical signal using a refractive geometry, and which provides different diffraction orders to the output ports.

In essence, although MMI devices have been successfully used for different functionalities, their performance as polarisation splitters, as well as the performance of the rest of integrated polarisation splitters known to date, have different drawbacks, such as a large size for the device, low efficiency, high losses, limited bandwidth or complex manufacturing. Thus, in the state of the art there is a need for an integrated polarisation splitter that is compact, efficient, with a high bandwidth and which is easy to manufacture.

Description of the Invention

The present invention solves the aforementioned problems by means of a polarisation splitter based on a multimode interference coupler with an anisotropic SWG multimode waveguide region, in other words, a region formed by an alternating arrangement of sections of a core material and sections of a cladding material, with a period smaller than the wavelength of a light propagated through said anisotropic region, in which said anisotropy is adjusted by rotating the alternating sections. It must be noted that the SWG structure described does not lead to an increase in the difficulty or in the number of steps of the manufacturing process. Put differently, the polarisation splitter of the invention can be integrated together with any other combination of devices in a photonic chip, and manufactured during the same etching step as the rest of said devices (unlike other polarisation splitters that require multiple etch depths, inclined walls, additional materials, etc.).

The device, preferably implemented in silicon on insulator (SOI), comprises an input waveguide that receives a transverse electric (TE) mode and a transverse magnetic (TM) mode, and two output waveguides that transmit said modes separately. By controlling the anisotropic properties of the SWG structures through the rotation angle thereof with respect to the optical axis, one is able to generate a reverse Talbot self-image of the transverse electric (TE) mode at a first distance ($L_{TE}$) corresponding to approximately three times a beat length of said TE mode ($L_{\pi TE}$); and a reverse Talbot self-image of the transverse magnetic (TM) mode at a second distance ($L_{TM}$), corresponding to approximately three times a beat length of said TE mode ($L_{\pi TM}$). It must be noted that direct Talbot self-image must be understood as the position in which the modes propagated through the multimode interference (MMI) region constructively interfere in a maximum aligned with the input waveguide. Likewise, in the reverse Talbot self-image, the multimode interference results in a maximum transversely displaced with respect to the input waveguide.

The geometric parameters of the SWG structure of the MMI of the invention are selected by means of optimisation through photonic simulation, imposing that the beat length of the TM mode ($L_{\pi TM}$) is a whole number times greater than the beat length of the TE mode ($L_{\pi TE}$), preferably twice as great. With the aim of optimising the focalisation of the self-imaging of the TE and TM modes in the first output waveguide (direct image) and the second output waveguide (reverse image), respectively, the total length of the multimode interference coupler is preferably approximately three times greater than $L_{\pi TM}$ and six times greater than $L_{\pi TE}$. It must be noted that the control of the anisotropy provided by the rotation of the SWG structures increases the degree of freedom when selecting the proportionality factor between the focalisation distances of the self-imaging of the TE and TM modes, resulting in a more compact device and smaller losses than the MMI in which said rotation is not present. Likewise, it must be noted that although other SWG geometric parameters such as the period or the fill factor can affect the resulting anisotropy, said effect is significantly less than that which is produced by rotation, thereby limiting the features obtainable by the splitter. Furthermore, it must be noted that, unlike said parameters (period and fill factor) the rotation angle does not affect the minimum feature size of the device and therefore does not affect manufacturing difficulty thereof.

The SWG structure of the multimode interference coupler is rotated an angle (α) greater than zero to control the anisotropic behaviour, enabling to independently control the focalisation distances of the Talbot self-images and thereby reduce the length of the device (in other words, the dimension of the device in the main propagation direction, also known as the optical axis). In other words, the interfaces between the plurality of sections of the core material and the plurality of sections of cladding material form an angle (α) greater than zero with a plane that is perpendicular to the optical axis of the device, said optical axis being defined by the common direction of the input waveguide, the first output waveguide and the second output waveguide. It must be noted that the exact angle (α) at which the response of the device is optimised depends on the rest of the geometric parameters of the MMI (width, height, cladding material, period and fill factor), being determined by means of the corresponding photonic simulations.

It must also be noted that in conventional MMIs, the whole number that establishes the proportionality between beat lengths must be chosen from a range limited by the physical parameters of the device, typically equal to or greater than 5. The control of the anisotropic properties of the SWG structure of the present invention allows said number to be established at two, and the beat lengths of the TE and TM modes to be adjusted by the angle (α) selection in order to comply with said proportionality relationship, resulting in a significant total size reduction of the device.

According to two preferred options, the sections of core material can be continuous, or divided into two or more parts by a gap, filled or completed by the cladding material. Likewise, depending on the specific implementation of the MMI, the geometric characteristics of the SWG region can be kept constant throughout the entire device, or can be modified throughout the same, either gradually or in increments. Also according to preferred options, the input waveguide, the first output waveguide and/or the second output waveguide can either be arranged perpendicularly to the MMI interface or have a non-perpendicular angle to said interface.

With the aim of optimising the insertion losses in the transition between the single mode waveguides and the multimode region of the MMI, the device comprises a first taper connected to the input waveguide, a second taper connected to the first output waveguide and a third taper connected to the second output waveguide. The tapers comprise SWG structures with a variable width, preferably with a central bridge with a width that is inversely proportional to the width of the taper. Likewise, the SWG structures of the tapers preferably have a progressive rotation between a direction perpendicular to the waveguide and the angle ($\alpha$).

Although the optimum angle ($\alpha$) depends on the materials used and on the rest of the geometric parameters of the SWG structure (for example on the height, width, period and/or fill factor), for an example in silicon on insulator with a height of 0.26 microns, a period of 0.22 microns and a fill factor of 0.5, the angle ($\alpha$) is preferably comprised at an interval between 5° and 25°, and more preferably between 10° and 20°. However, the angle ($\alpha$) is generally selected during the design of the device by means of photonic simulation such that the first ($L_{TE}$) and the second ($L_{TM}$) distance are minimised, always maintaining the proportionality relationship between both.

The device described therefore provides a compact polarisation splitter with low losses and high bandwidth that is able to be manufactured in a single lithography step. In other words, the performance improvement is not associated with an increase in manufacturing complexity. These and other advantages of the invention will become apparent in the light of its detailed description.

DESCRIPTION OF THE FIGURES

In order to assist in a better understanding of the characteristics of the invention according to a preferred practical exemplary embodiment thereof and to complement this description, the following figures, of illustrative and non-limiting nature, are attached.

PREFERRED EMBODIMENT OF THE INVENTION

It must be noted that the invention is described with the device operating as a polarisation splitter. However, the same device can operate in a reciprocal way as a polarisation multiplexer, in other words, combining two orthogonal polarisation signals of two input waveguides in a single output waveguide, by simply reversing the operation direction of the device.

However, it must be noted that the polarisation splitter object of the invention is preferably implemented in silicon on insulator (SOI) to thus benefit from the high rate of contrast of SOI; however, particular embodiments could be implemented in other, different photonic platforms. In other words, all the waveguides of the device are preferably made by means of a silicon core, deposited on an insulator layer, such as for example silicon dioxide. The cladding material can vary for different embodiments of the invention, some of the possibilities being silicon dioxide, polymers or air, without this list limiting the use of other possible options.

With regard to the manufacture of the devices proposed, it must be noted that the sub-wavelength structures (SWG), independent of the rotation angle thereof with respect to the optical axis, do not increase the difficulty or the number of steps with respect to the manufacture of conventional waveguides. In other words, all of the structures used by the polarisation splitter of the invention can be manufactured in a single etching step at a complete depth of any conventional microelectronic etching technique, for example by means of e-beam or deep-UV lithography.

Figure 1:
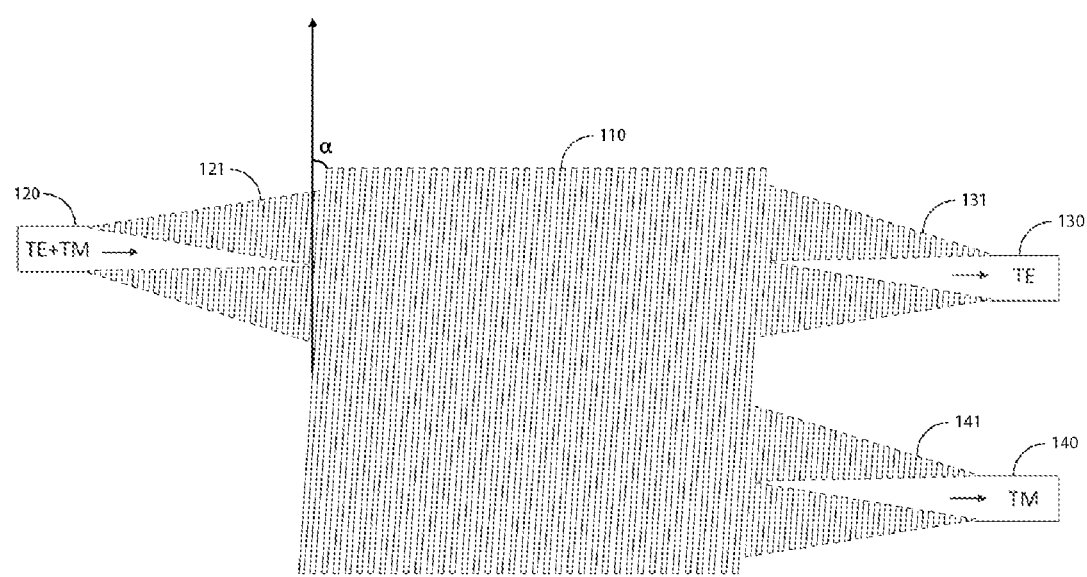
FIG. 1 shows a multimode interference coupler with rotated sections according to a preferred embodiment of the invention.

FIG. 1 shows a first preferred embodiment of the invention based on a multimode interference coupler (110), more specifically a multimode interference coupler (110) provided with sub-wavelength grating (SWG) structures, the multimode waveguide region of which has anisotropic characteristics generated by a periodic arrangement of sections of a core material (210) and sections of cladding material (230) with a period ($\Lambda$) smaller than the wavelength of a light propagated through said anisotropic region. The polarisation splitter of the invention further comprises an input waveguide (120) that receives the transverse electric (TE) mode and the transverse magnetic (TM) mode, a first output waveguide (130) intended to transmit the transverse electric (TE) mode and a second output waveguide (140) intended to transmit the transverse magnetic (TM) mode. The input waveguide (130) is located on one end of the anisotropic region of the SWG multimode interference coupler (110), facing the first output waveguide (130), which is located on the opposite end of the SWG multimode interference coupler (110), while the second output waveguide (140) is also located on said opposite end of the multimode interference coupler (110), laterally separated from the first output waveguide (130).

With the aim of reducing the reflection losses in the interfaces of the multimode interference coupler (110), the polarisation splitter comprises a first taper (121), also known as mode adapter, connected to the input waveguide (120), a second taper (131) connected to the first output waveguide (130) and a third taper (141) connected to the second output waveguide (140). The first taper (121), the second taper (131) and the third taper (141) have SWG structures with the same period ($\Lambda$) and duty cycle (f) as the multimode interference coupler (110), while the width thereof progressively varies from the width of a single mode waveguide to a final width of the taper, preferably greater than the width of the single mode waveguide, and therefore, the SWG structures preferably have an incremental width. The first taper (121), the second taper (131) and the third taper (141) likewise comprise a central bridge, meaning a small connector made of core material (210) in the centre of the sections of cladding material (230). The width of the central bridge is reduced as the total width of the respective taper (121,131,141) increases, completely disappearing in the interface with the multimode region of the multimode interference coupler (110). It must be noted that the specific geometry of the taper (130) can vary among implementations, as long as smooth modal transition can be guaranteed, minimising reflections in the interfaces between the multimode interference coupler (110), the input waveguide (120) the first output waveguide (130) and the second output waveguide (140).

Figure 2:
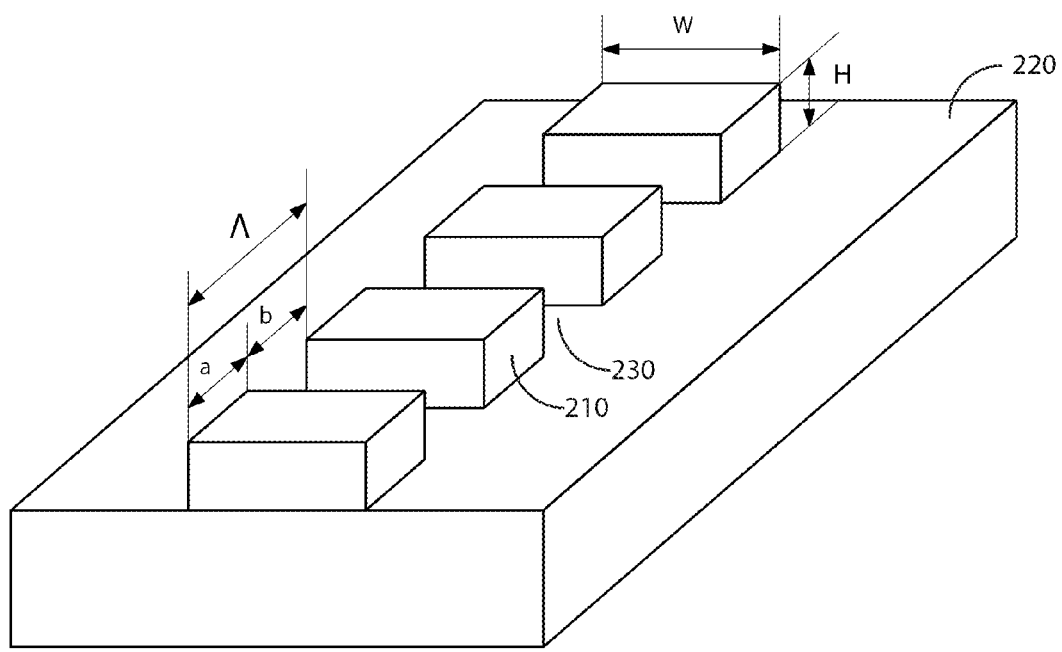
FIG. 2 illustrates the main geometric parameters of a sub-wavelength structure.

FIG. 2 shows the main parameters of any SWG structure in more detail, which can be adjusted by means of photonic simulations in order to engineer the refractive index and dispersion. Specifically, said SWG parameters include the width of the waveguide (W), the height of the waveguide (H), the period ($\Lambda$) and the duty cycle (f). The duty cycle, also known as fill factor, is the relationship between a length (a) of the section of core material (210), and a length (b) of the section of cladding material (230), within a period ($\Lambda$). Both the sections of core material (210) as well as the sections of cladding material (230) are arranged on at least one layer of insulator material (220).

Figure 3:
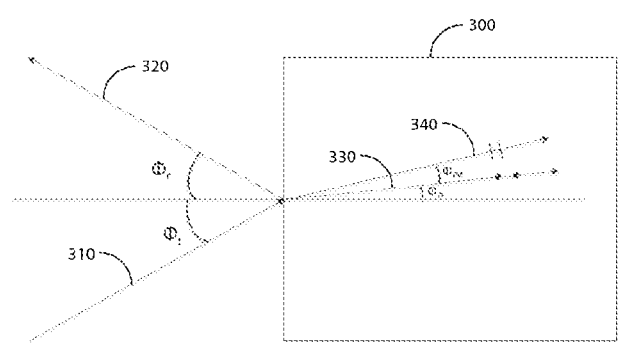
FIG. 3 exemplifies the propagation principles of ordinary and extraordinary beams in an anisotropic structure.

FIG. 3 schematically illustrates the behaviour of any anisotropic material (300), applicable to the comprehension of the anisotropic multimode waveguide region of the multimode interference coupler (110) of the invention. When an incident beam (310) reaches an interface with the anisotropic material (300) with an angle of incidence ($\Phi_i$), one part of the optical power is reflected, generating a single conventional reflected beam (320), with an angle of reflection ($\Phi_r$). However, the power transmitted to the anisotropic material (300) does not result in a single beam, as occurs in conventional isotropic materials, rather it generates two beams with different angles: an ordinary beam (330) with polarisation parallel to the interface (in other words, TE polarisation), and a first angle of transmission ($\Phi_{TE}$); and an extraordinary beam (340) with polarisation perpendicular to the interface (in other words, TM polarisation), and a second angle of transmission ($\Phi_{TM}$). The difference between the first angle of transmission ($\Phi_{TE}$) and the second angle of transmission ($\Phi_{TM}$), as well as the difference of effective index perceived by the two modes, are used in the anisotropic multimode waveguide region of the multimode interference coupler (110) of the invention for selecting the proportionality relationship between the distances at which the Talbot self-imaging of the modes are generated.

In other words, the anisotropic SWG region of the multimode interference coupler (110) generates a Talbot self-image of the transverse electric (TE) mode at a first distance ($L_{TE}$), and a Talbot self-image of the transverse magnetic (TM) mode at a second distance ($L_{TE}$). Selecting the geometric parameters of the SWG structure of said multimode interference coupler (110) by means of photonic simulation, in other words, the height of the waveguide (H), the period ($\Lambda$) and the duty cycle (f), results in the second distance ($L_{TM}$) being a whole number times greater than the first distance ($L_{TE}$). In this preferred embodiment, the second distance ($L_{TM}$) can be approximately two times greater than the first distance ($L_{TM}$). By imposing a total length of the multimode interference coupler (110) a whole number times greater than the second distance ($L_{TM}$), the TE mode is focalised on the first output waveguide (130) and the TM mode on the second output waveguide (140). Furthermore, the greater the anisotropic behaviour of the material, the more unequal the relationship between the first distance ($L_{TE}$) and the second distance ($L_{TM}$) will be, and therefore, the more compact the resulting multimode interference coupler (110) will be.

The anisotropic behaviour of the multimode interference coupler (110) of the invention (in other words, the difference between the effective refractive indices for the TE and TM modes of order 0 and order 1) can be controlled by rotating the SWG structure of the anisotropic region an angle ($\alpha$). In other words, interfaces between the plurality of sections of the core material (210) and the plurality of sections of cladding material (230) form an angle ($\alpha$) greater than zero with a plane that is perpendicular to the optical axis of the system, meaning, to the axis defined by the direction of the input waveguide (120), the first output waveguide (130) and the second output waveguide (140) at the input to the multimode interference coupler (110). The section of an angle ($\alpha$) greater than zero allows the beat lengths of the TE and TM modes to be adjusted so that they are proportional in a double factor, thereby optimising the length of the multimode interference coupler (110).

It must be noted that in alternative embodiments of the invention, the input waveguide (120), the first output waveguide (130) and the second output waveguide (140) can have angles different than 90° in the interface thereof with the multimode interference coupler (110). In other words, the device of FIG. 4, the angle of incidence ($\Phi_i$) with the average anisotrope is 0°, corresponding to a perpendicular incidence. However, in other embodiments, said angle of incidence ($\Phi_i$) can be increased by rotating the input waveguide (120), thereby modifying the first angle of transmission ($\Phi_{TE}$) and the second angle of transmission ($\Phi_{TM}$). By modifying said angles, also modified are the first distance ($L_{TE}$) and the second distance ($L_{TM}$) at which Talbot self-images are generated, enabling to thereby reduce the size of the resulting device.

Likewise, it is possible to implement the SWG anisotropic region of the multimode interference coupler (110) including one or more gaps in the sections of the core material (210), said gaps being filled by the cladding material (230). For example, in a preferred embodiment, each section of the sections of core material (210) schematically shown in the FIGS. 1 and 4 can be divided into two sections, separated by a central gap filled by the cladding material (230). The number and arrangement of said gaps can vary between implementations.

Regardless of the particular geometry of the multimode interference coupler (110), when the SWG structure of the anisotropic region is rotated an angle ($\alpha$), it is recommendable to modify the first taper (121), the second taper (131) and the third taper (141), with respect to the case of the perpendicular SWG structure shown in FIG. 1, with the aim of optimising the transitions between said multimode interference coupler (110), the input waveguide (120), the first output waveguide (130) and the second output waveguide (140). To do so, said first taper (121), second taper (131) and third taper (141) comprise SWG structures that are progressively rotated between 0° at the end farthest from the multimode interference coupler (110), and the angle ($\alpha$) at the end in contact with said multimode interference coupler (110).

The design of the device is preferably done by means of a photonic simulation process in two stages. In the first stage, a first approximation of the design is obtained by means of the simulation of the SWG structure as a homogenous and anisotropic material. The anisotropic material used is defined by a dielectric tensor, obtained by means of Rytov approximation for the effective indices of the ordinary ray (330) and the extraordinary ray (340). In particular, preferably selected is a multimodal region of an initial width approximately three times greater than that of the taper and a waveguide height (H) defined by the photonic platform on which the device is implemented. Establishing these starting parameters, photonic simulations are carried out for a sweep of rotation angles ($\alpha$), thereby modelling the evolution of the anisotropic properties of the MMI for the particular case of the application of the device. This first approximation allows simulations to be carried out in three dimensions reducing the computational time and cost of the simulation. Although the use of waveguide heights of 260 nm are recommended in order to facilitate the confinement of the transverse magnetic (TM) mode, it must be noted that the device of the invention can adapt to other heights of the waveguide (H).

Once the anisotropic properties are modelled at different angles for the specific geometry and platform under analysis, said modelling is applied to a first optimisation by means of a sweep of different parameters, such as the width of the multimodal region, the duty cycle of the corresponding real SWG structure or the length of the polarisation splitter. Said first optimisation process is done by executing sweeps of the aforementioned parameters and imposing as objectives the minimisation of total insertion losses, as well as the verification of a proportionality factor as close as possible to 2 between the beat lengths of the transverse electric (TE) and transverse magnetic (TM) modes. As a result of this optimisation, an approximation of the initial design parameters (angle, width of the multimodal region, period, duty cycle and length of the device) is obtained.

From the design parameters obtained in the first stage, the physical modelling of the complete SWG structure (without approximations to the homogenous medium) is then carried out, which provides us with the final design of the polarisation splitter. Although this process can be done maintaining the degrees of freedom of all of the design parameters, it is recommended that this second optimisation process be simplified in order to reduce the computational load of the same, establishing the width of the multimodal region (for example at 4 microns), the duty cycle (for example 0.5 so as to simplify the manufacturing), and the period (always imposing that said period is outside the Bragg regime, determined by the proportionality relationship between the period of the SWG structure; and the effective wavelength of the light propagated through said structure).

The multiplicity between the beat lengths is then optimised by means of fine tuning (in other words, by means of sweeps of less variability than in the first stage) of the rotation angle and the number of periods (and in the case of not having been established according to the recommendation of the previous step, of the duty cycle, the width of the multimodal region, and/or the SWG period). As an objective of this optimisation, a minimisation of the beat length deviation of the transverse magnetic mode is imposed with respect to twice the beat length of the transverse electric mode. This second optimisation process is preferably done using three-dimensional finite difference time domain method (FDTD), although other photonic computation techniques can likewise be applied to the same.

Figure 4A:
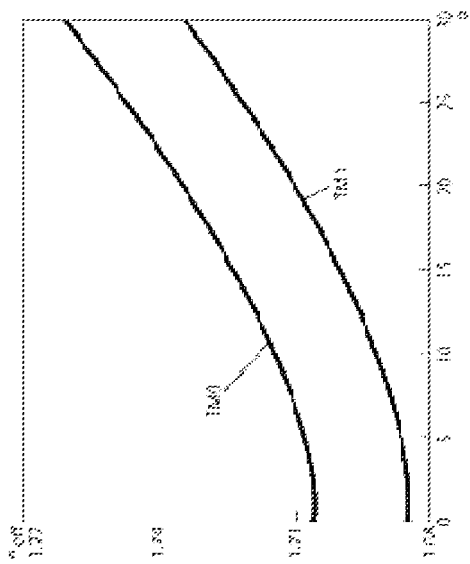
FIG. 4 illustrates the effect of the rotation angle on the anisotropic properties of a SWG structure.
Figure 4B:
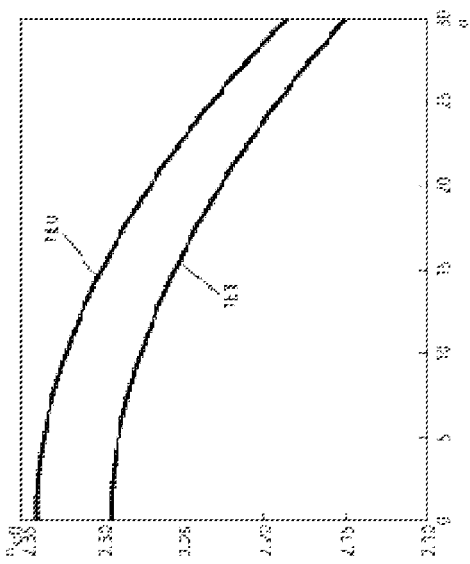

Although the exact effect of the rotation of the SWG structure depends on the properties of the materials that make up the same, as well as the rest of the geometric parameters, FIG. 4 exemplifies this effect for the case of a SWG structure of silicon on insulator with a wavelength height of 260 nm, a width of 4 microns, a period of 220 nm and a fill factor of 0.5, for a wavelength of 1550 nm. FIG. 4a shows the effective refraction indices ($n_{eff}$) as a function of the angle ($\alpha$) for a TE mode of the order 0 (TE0) and for a TE mode of the order 1 (TE1). FIG. 4b shows the effective refraction indices ($n_{eff}$) as a function of the angle ($\alpha$) for a TM mode of the order 0 (TM0) and for a TM mode of the order 1 (TE1). It must be noted that an increase in the rotation angle ($\alpha$) reduces the effective indices ($n_{eff}$) of the TE0 and TE1 modes and increases the effective indices ($n_{eff}$) of the TM0 and TM1 modes, the effect on the TE polarisation being also significantly greater than on the TM polarisation.

The invention claimed is:

1. An integrated polarization splitter comprising a multimode interference coupler which in turn comprises:
   an input waveguide intended to feed a transverse electric (TE) mode and a transverse magnetic (TM) mode of an optical signal to the multimode interference coupler,
   a first output waveguide intended to transmit the transverse electric (TE) mode of the optical signal,
   a second output waveguide intended to transmit the transverse magnetic (TM) mode of the optical signal,
wherein the multimode interference coupler additionally comprises an anisotropic multimode waveguide region formed by a plurality of sections of a core material and a plurality of sections of a cladding material, respectively alternately arranged in a periodic way with a period ($\Lambda$) smaller than the wavelength of the optical signal propagated through said anisotropic multimode waveguide region; and being wherein the plurality of sections of core material and the plurality of sections of cladding material of the anisotropic multimode waveguide region form an angle ($\alpha$) greater than zero with a plane perpendicular to the input waveguide, the first output waveguide and the second output waveguide, being the splitter characterised in that the angle ($\alpha$) is greater than zero, and wherein the polarization splitter comprises:
   a first taper connected to the input waveguide;
   a second taper connected to the first output waveguide; and
   a third taper connected to the second output waveguide, wherein each one of: the first taper, the second taper and the third taper, respectively, comprise:
   a waveguide with variable width, and
   sections of core material and sections of cladding material arranged in an alternating and periodic way.

2. The polarization splitter according to claim 1, characterised in that the angle ($\alpha$) is comprised between 5° and 25°.

3. The polarization splitter according to claim 2, characterised in that the angle ($\alpha$) is comprised between 10° and 20°.

4. The polarization splitter according to claim 1, characterised in that the plurality of sections of core material comprise a central gap filled by cladding material.

5. The polarization splitter according to claim 1, characterised in that the first taper, the second taper, the third taper, respectively, comprise a central bridge made of core material that joins the sections of core material, the width of each central bridge being inversely proportional to the width of the respective taper.

6. The polarization splitter according to claim 1, characterised in that the anisotropic region of the multimode interference coupler has constant geometric properties throughout the length thereof.

7. The polarization splitter according to claim 1, characterised in that the anisotropic region of the multimode interference coupler comprises a variable geometry throughout the length thereof.

8. The polarization splitter according to claim 1, characterised in that at least one waveguide selected among: the input waveguide, the first output waveguide and the second output waveguide is arranged with an angle different than 90° in an interface with the multimode interference coupler.

9. The polarization splitter according to claim 1, characterised in that the core material is silicon.

10. The polarization splitter according to claim 9, characterised in that the core material is arranged on an insulator layer.

* * * * *